(12) United States Patent
Weich et al.

(10) Patent No.: US 7,575,004 B2
(45) Date of Patent: Aug. 18, 2009

(54) GAS MASK FOR NORMAL PRESSURE OPERATION AND OVERPRESSURE OPERATION

(75) Inventors: Rüdiger Weich, Rivnitz-Damgarten (DE); Thomas Grassl, Lübeck (DE); Rüdiger Müller, Stockelsdorf (DE); Manfred Gdulla, Lübeck (DE); Siegbert Tolk, Lübeck (DE); Olaf Balke, Reinfeld (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 381 days.

(21) Appl. No.: 11/195,129

(22) Filed: Aug. 2, 2005

(65) Prior Publication Data

US 2006/0086360 A1    Apr. 27, 2006

(30) Foreign Application Priority Data

Oct. 27, 2004    (DE)    ........................ 10 2004 052 173

(51) Int. Cl.
*A62B 7/08* (2006.01)
*A62B 9/02* (2006.01)
*A62B 18/10* (2006.01)

(52) U.S. Cl. ............................ 128/204.26; 128/205.24; 128/207.12; 137/860

(58) Field of Classification Search ............ 128/204.19, 128/205.24, 207.12, 203.12, 204.26, 205.25, 128/201.28, 205.26, 206.15, 200.29, 201.22, 128/203.11, 204.29; 137/535, 540, 543.23, 137/860, 859, 843, 906, 907, 908; 251/231, 251/243, 177, 228, 282, 239
See application file for complete search history.

(56) References Cited

U.S. PATENT DOCUMENTS

| | | | | |
|---|---|---|---|---|
| 4,378,011 A * | 3/1983 | Warncke et al. | ......... | 128/204.26 |
| 4,572,176 A * | 2/1986 | Walther | ................. | 128/204.26 |
| 5,070,872 A * | 12/1991 | Neuber | ................... | 128/205.24 |
| 5,165,625 A * | 11/1992 | Gutman | ................... | 244/118.5 |
| 5,499,624 A * | 3/1996 | Kruger et al. | ........... | 128/204.26 |
| 5,704,348 A | 1/1998 | Drews | | |
| 5,839,436 A * | 11/1998 | Fangrow et al. | ......... | 128/205.24 |
| 6,394,091 B1 * | 5/2002 | Giorgini | ................. | 128/206.21 |
| 2006/0048774 A1 * | 3/2006 | Townsend et al. | ...... | 128/200.24 |

FOREIGN PATENT DOCUMENTS

| | | |
|---|---|---|
| DE | 196 11 556 C1 | 5/1997 |
| EP | 0 667 171 A1 | 8/1995 |
| IT | 12 27 248 B | 3/1991 |

\* cited by examiner

*Primary Examiner*—Danton DeMille
(74) *Attorney, Agent, or Firm*—McGlew and Tuttle, P.C.

(57) ABSTRACT

A gas mask for normal pressure operation and overpressure operation allows changeover of the expiration valve (4) from normal pressure operation to overpressure operation is made possible in a simple manner. The pretension of the valve spring (7) of the expiration valve (4) is adjusted by an angle lever (10) pivotable about an axis of rotation (13).

10 Claims, 2 Drawing Sheets

GAS MASK FOR NORMAL PRESSURE OPERATION AND OVERPRESSURE OPERATION

CROSS REFERENCE TO RELATED APPLICATIONS

This application claims the benefit of priority under 35 U.S.C. § 119 of German Application 10 2004 052 173.5 filed Oct. 27, 2004, the entire contents of which are incorporated herein by reference.

FIELD OF THE INVENTION

The present invention pertains to a gas mask for normal pressure operation and overpressure operation.

BACKGROUND OF THE INVENTION

A gas mask of the type mentioned has become known from EP 667 171 A1. In gas masks operating with overpressure, a pressure is generated within the interior space of the mask, which is to prevent harmful gases from penetrating into the mask. Gas masks with a filter at the mask connection operate under normal pressure. The opening pressure of the expiration valve must be adapted to the mode of operation by means of a changeover switch in the prior-art gas mask, which can be used for both normal pressure operation and overpressure operation. The expiration valve is received for this purpose in a valve housing in the vicinity of the breathing connection, and the expiration valve comprises a pin, which is displaceable in relation to the valve housing, a valve disk, a valve plate, which is in contact with the valve seat, and a valve spring between the valve disk and the valve plate. The pin with the valve disk, the valve plate and the valve spring are connected with one another in one assembly unit. A sensor, which is braced in relation to the valve housing with a compression spring, extends from the breathing connection into the valve housing and is in contact by its rear side with the valve disk. The compression spring and the valve spring are arranged in a series-connected arrangement, and the compression spring is softer than the valve spring.

In case of normal pressure operation, for example, with the filter inserted at the breathing connection, the sensor can move freely and the pin of the expiration valve slides within the valve housing when the valve plate is lifted off from the valve seat during expiration. Since the valve disk is supported against the sensor, the opening pressure of the expiration valve is determined by the rigidity of the compression spring and by the pretension thereof.

In case of the use of a lung demand valve for overpressure operation, the sensor is blocked and so is the pin in the valve housing via the valve disk. The opening pressure of the expiration valve is determined solely by the rigidity and the pretension of the valve spring.

The drawback of the prior-art gas mask is that the design of the changeover switch with two springs connected in series is complicated and prone to errors.

A changeover switch for normal pressure operation and overpressure operation at a gas mask is known from IT 12 27 248 B, in which the opening pressure of the expiration valve is adapted to the mode of operation by changing the pretension of the valve spring. The force with which the valve spring is pressed against the valve plate is increased for this purpose by means of a displaceable sensor when a lung demand valve for overpressure operation is connected to the breathing connection. The drawback is that a relatively long path of adjustment of the sensor is necessary for changing over from normal pressure operation to overpressure operation.

SUMMARY OF THE INVENTION

The basic object of the present invention is to provided an improved gas mask of the above-described type such that the changeover from normal pressure operation to overpressure operation is made possible in a simple manner.

According to the invention, a gas mask is provided with a gas inlet and with an expiration means, which has a valve spring and a adjusting means. The adjusting means affects the pretension of the valve spring with which the changeover from normal pressure operation to overpressure operation is performed. The adjusting means comprises an angle lever pivotable about a axis of rotation.

The advantage of the present invention is essentially that due to the use of such an angle lever as an adjusting means for the pretensioning force of the valve spring of the expiration valve, a great change in the pretensioning force and consequently in the opening pressure can be achieved with a short switching path. The angle lever, which is pivotable about an axis of rotation, has a short actuating lever, which can be caused to engage the breathing connection with the overpressure means which can be plugged in, a lung demand valve, and a comparatively long supporting lever, with which the free end of the valve spring is in contact. The path of adjustment of the valve spring and consequently the opening pressure of the expiration valve can be set by varying the length ratio of the actuating lever and the supporting lever. Furthermore, it is advantageous that an angular offset develops between the supporting lever and the valve disk due to the pivoting of the angle lever, as a result of which frictional forces, which damp possible vibrations of the valve, will develop within the guide of the valve disk. Such a damping of the valve is described in the patent DE 1 96 11 556 C1 (see also corresponding U.S. Pat. No. 5,704,348 which is incorporated herein by reference). Both a simple possibility of adjusting the valve spring and vibration damping of the expiration valve can thus be achieved in a combined manner with the angle lever described in the present invention.

The front side of the actuating lever is advantageously provided with a bevel directed toward the axis of rotation. The angle α of the bevel is preferably in a range of 5° to 50°. The pivoting stroke of the angle lever can be affected by the bevel. The more the front side of the actuating lever is beveled toward the axis of rotation, the greater will be the pivoting stroke and thus the compression of the valve spring. The pretensioning force of the valve spring and consequently the opening pressure of the expiration valve can thus be set.

According to another aspect of the invention, a human breathing device has a user interface part to be connected to the user defining a breathing space at the mouth of the user. A breathing connection is connected to the user interface part and is provided with an intake passage connection and an exhalation passage. An expiration valve is associated with the breathing connection and is provided for regulating passage of gas out of said breathing space. The valve includes a valve spring and an adjusting device affecting a pretension of the valve spring. The adjusting device includes an angle lever pivotable about an axis of rotation for performing a changeover from normal pressure operation with less pretension of the valve spring to an overpressure operation with greater pretension of the valve spring.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
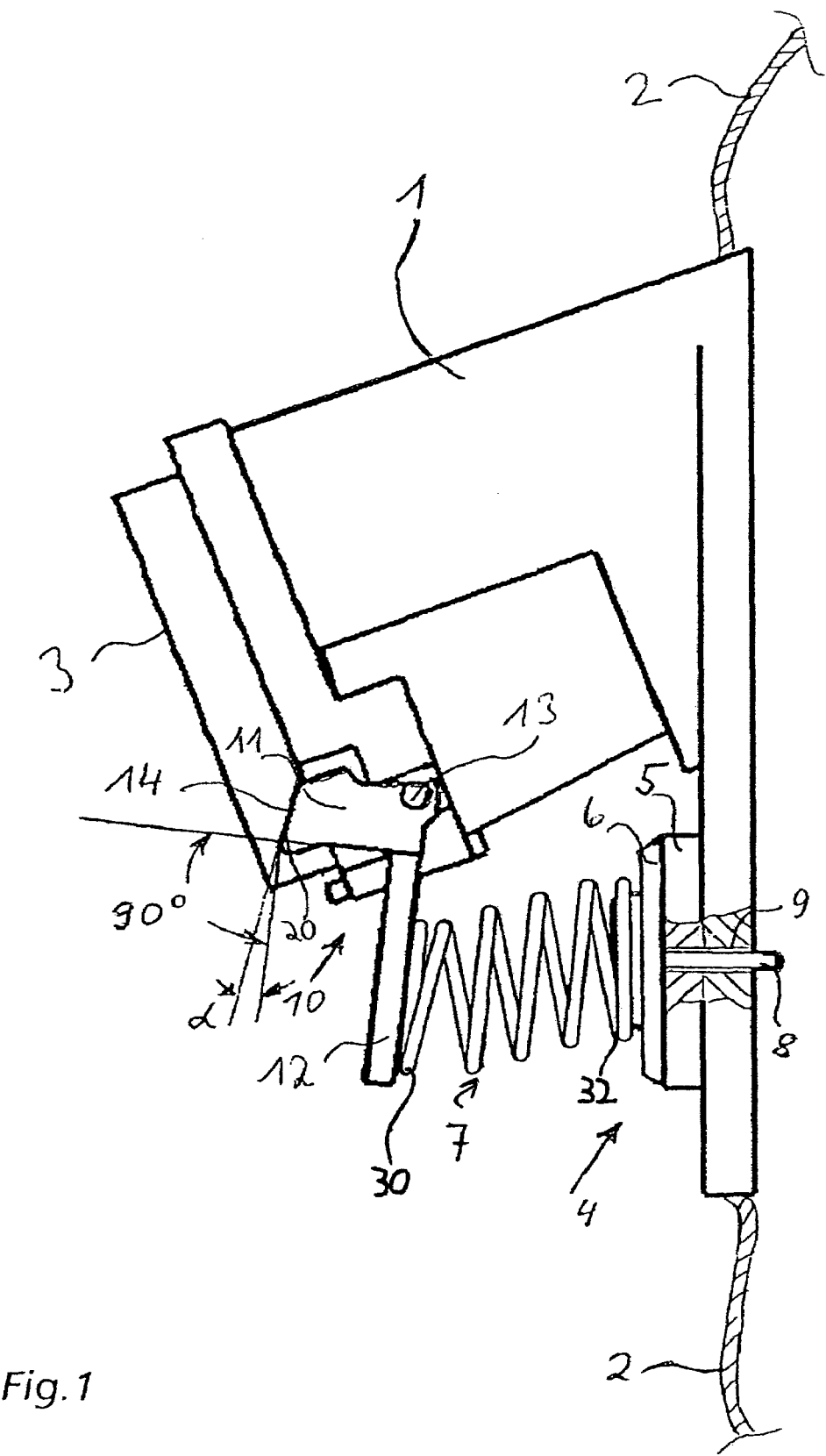
FIG. 1 is a schematic partially sectional cut away view showing a detail of a gas mask in the area of the breathing connection for normal pressure operation.

Referring to the drawings in particular, FIG. 1 schematically shows a breathing connection 1 at the mask body 2 of a gas mask (not fully shown). The breathing connection 1 has an opening 3 on its front side for the connection of a filter or a lung demand valve. An expiration valve 4 arranged in the vicinity of the breathing connection 1 comprises a valve seat 5, a valve disk 6 and a valve spring 7. The valve disk 6 is guided axially in a hole or expiration passage 9 of the breathing connection by means of a pin 8. An angle lever 10 with an actuating lever 11 and with a supporting lever 12 arranged at right angles thereto is fastened to the breathing connection 1 pivotably about an axis of rotation 13. The front side 14 of the actuating lever 11 is beveled by about 20° toward the axis of rotation 13. The valve spring 7, offset in the horizontal direction, is received between the supporting lever 12 and the valve disk 6. A slight frictional force is generated by the horizontal offset of the valve spring 7 between the pin 8 and the hole 9 during the opening movement, and the vibrations of the valve that develop are damped by this frictional force.

FIG. 1 illustrates the position of the angle lever 10 during normal pressure operation with minimum pretension of the valve spring 7, so that the expired gas can flow off into the environment via the expiration valve 4 without an appreciable flow resistance.

Figure 2:
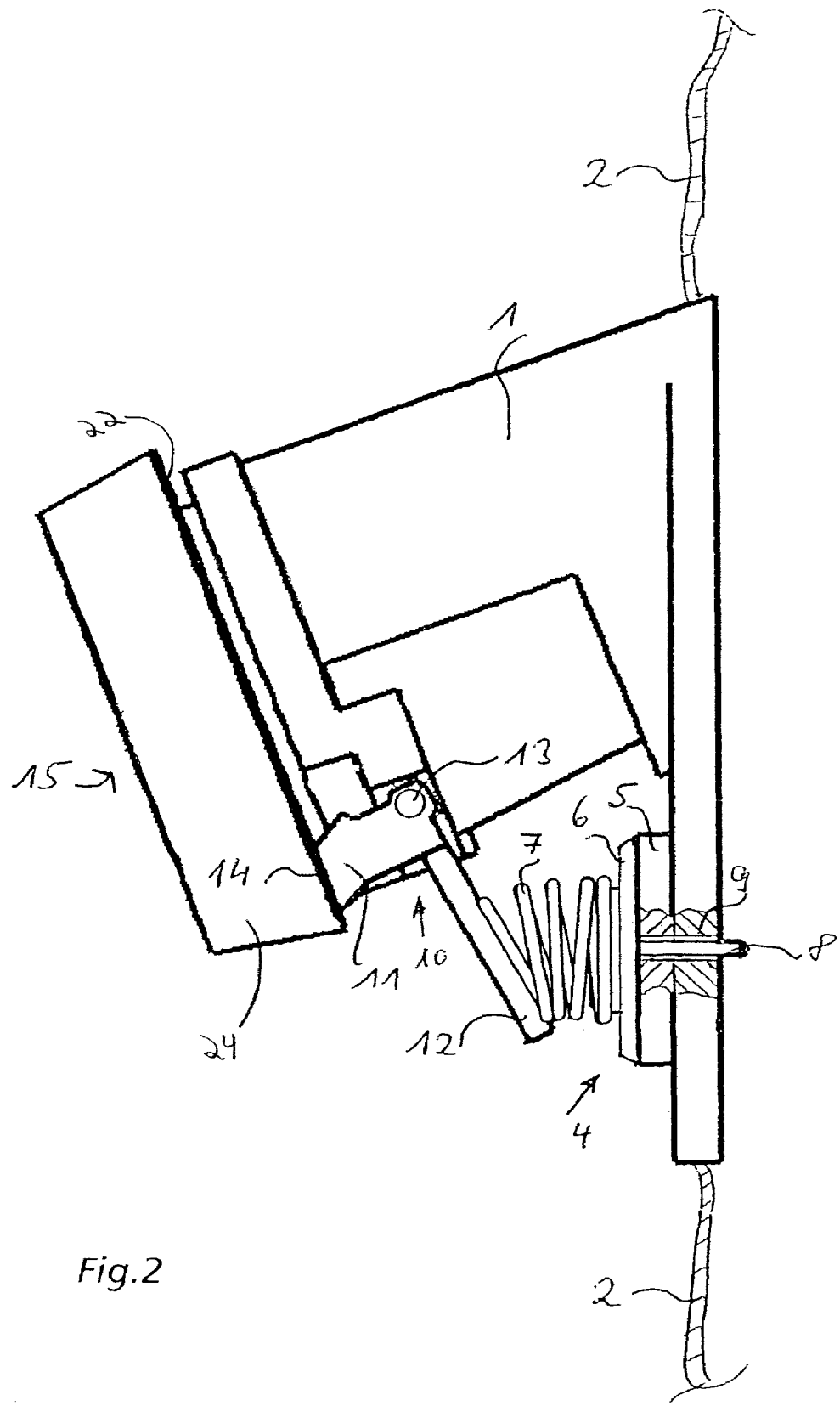
FIG. 2 is a view similar to FIG. 1 showing the gas mask according to FIG. 1 for overpressure operation.

FIG. 2 illustrates the position of the angle lever 10 during overpressure operation with a lung demand valve 15 attached. The lung demand valve 15 includes an lung demand valve connection part 22 communicating with a gas delivery device or includes a connection part 22 as shown with an incorporated gas delivery device such as a rotary compressor. Identical components are designated by the same reference numbers as in FIG. 1. The front side 14 of the actuating lever is in contact now with the lung demand valve 15, so that the angle lever 10 is pivoted (based on the contact) about the axis of rotation 13 and the valve spring 7 is compressed in the process. The opening pressure of the expiration valve 4 is increased due to the compression of the valve spring 7 and the higher pretension on the valve disk 6, which is associated therewith. The pretension of the valve spring 7 and consequently the opening pressure of the expiration valve 4 can be affected by varying the bevel of the front side 14 and the length ratio of the actuating lever 11 and the supporting lever 12.

While a specific embodiment of the invention has been shown and described in detail to illustrate the application of the principles of the invention, it will be understood that the invention may be embodied otherwise without departing from such principles.

What is claimed is:

1. A human breathing device, comprising:
a lung demand valve;
a user interface part to be connected to the user defining a breathing space at the mouth of the user;
a breathing connection connected to the user interface part, said breathing connection having an intake passage connection and an exhalation passage, said lung demand valve being detachably connected to said breathing connection; and
an expiration valve associated with the breathing connection, said expiration valve for regulating passage of gas out of said breathing space, said expiration valve including a valve spring and an adjusting device affecting a pretension of said valve spring, said adjusting device including an angle lever pivotable about an axis of rotation for performing a changeover from a stable angular position for normal pressure operation with less pretension of said valve spring to a different angular position for an overpressure operation with greater pretension of said valve spring, said valve spring being connected to said angle lever and said expiration valve.

2. A human breathing device in accordance with claim 1, wherein said angle lever has an actuating lever, said actuating lever engaging said lung demand valve when said lung demand valve is connected to said intake passage connection, said angle lever having a supporting lever connected to said actuating lever to affect the pretensioning force of the valve spring.

3. A human breathing device in accordance with claim 2, wherein a front side of said actuating lever has a bevel directed toward the axis of rotation, said bevel defining an engagement surface to engage said lung demand valve.

4. A human breathing device in accordance with claim 3, wherein an angle α of said bevel is in the range of 5° to 50°.

5. A human breathing device, comprising:
a gas inlet;
a breathing interface including an expiration valve with valve spring and an adjusting device, which affects the pretension of said valve spring, said adjusting device performing a changeover function from normal pressure operation to overpressure operation, said valve spring having a first end portion and a second end portion, said adjusting device comprising an angle lever pivotable about an axis of rotation from a first rotational position to a second rotational position, said first end portion being fixed to said angle lever and said second end portion being fixed to said expiration valve; and
a gas delivery device having a demand valve connected to said breathing interface adjacent to said adjusting device.

6. A human breathing device in accordance with claim 5, wherein said gas delivery device is in contact with said angle lever, said angle lever being pivotable about an axis of rotation for performing a changeover from a stable angular position for normal pressure operation with less pretension of said valve spring to a different angular position for an overpressure operation with greater pretension of said valve spring.

7. A human breathing device in accordance with claim 5, wherein said gas delivery device compresses said angle lever such that said angle lever is in a non stable position during said overpressure operation.

8. A human breathing device in accordance with claim 5, wherein said angle lever has an actuating lever, which engages said gas delivery device, and a supporting lever directed essentially at right angles to said actuating lever to affect the pretensioning force of the valve spring.

9. A human breathing device in accordance with claim 8, wherein a front side of said actuating lever has a bevel directed toward the axis of rotation, said bevel defining an engagement surface to engage said gas delivery device.

10. A human breathing device in accordance with claim 9, wherein an angle $\alpha$ of said bevel is in the range of 5° to 50°.

* * * * *